June 11, 1957  R. P. GRAHAM ET AL  2,795,184
INTERNAL DRUM DEJUICING PRESS

Filed June 16, 1953  3 Sheets-Sheet 1

INVENTORS:
R. P. GRAHAM,
A. H. BROWN,
W. D. RAMAGE.

PER

R. Hoffman
ATTORNEY

June 11, 1957   R. P. GRAHAM ET AL   2,795,184
INTERNAL DRUM DEJUICING PRESS

Filed June 16, 1953   3 Sheets-Sheet 2

INVENTORS:
R.P. GRAHAM,
A.H. BROWN,
W.D. RAMAGE.
PER

R. Hoffman
ATTORNEY

June 11, 1957  R. P. GRAHAM ET AL  2,795,184
INTERNAL DRUM DEJUICING PRESS
Filed June 16, 1953  3 Sheets-Sheet 3

INVENTORS:
R. P. GRAHAM,
A. H. BROWN,
W. D. RAMAGE.
PER
R. Hoffman
ATTORNEY

United States Patent Office 2,795,184
Patented June 11, 1957

2,795,184

INTERNAL DRUM DEJUICING PRESS

Robert P. Graham and Amon H. Brown, El Cerrito, and William D. Ramage, Berkeley, Calif., assignors to the United States of America as represented by the Secretary of Agriculture Application June 16, 1953, Serial No. 362,173

1 Claim. (Cl. 100—121)

(Granted under Title 35, U. S. Code (1952), sec. 266)

A non-exclusive, irrevocable royalty-free license in the invention herein described, for all Government purposes, throughout the world, with the power to grant sublicenses for such purposes, is hereby granted to the Government of the United States of America.

This invention relates to and has as its prime object the provision of a device for effecting filtering and pressing operations. Although capable of general use in filtering and pressing operations, the device of this invention is particularly adapted to the dejuicing of fruit pulps or wastes containing fruit pulps, for example, the treatment of apples, grapes, pears, peaches, apricots, and other fruits to make fruit juices, the treatment of limed pear wastes or other fruit waste to separate the juice from the solid components, and so forth. Further objects and advantages of the invention will be obvious from the description herein taken in connection with the annexed drawing, in which Figs. 1 to 5 are perspective views, all of them illustrating one embodiment of the device of this invention.

Figure 1:
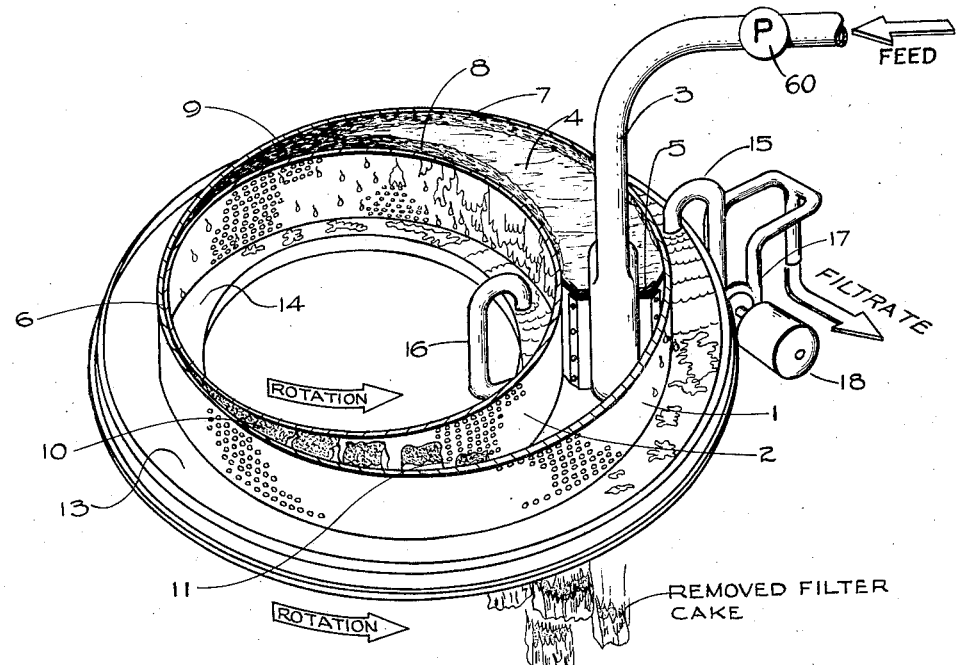
Fig. 1 is a partial cross sectional view through the filter drums with many parts omitted so that the filtering and pressing operations may be clearly depicted.

The preferred embodiment of the device of this invention comprises a pair of drums mounted with their axes parallel and in a vertical plane or in a plane which subtends a small angle with the vertical. One drum is smaller than the other and is eccentrically mounted within the larger drum, touching or nearly touching the larger drum to form a pinch point. Both drums are provided with filter surfaces and part of the space between the drums is used as a chamber wherein the material to be filtered is introduced and wherein the filtering and pressing operations occur. This chamber is generally horn-shaped, extending from a point where the separation between the drums is wide to the pinch point where the distance between the drums is at a minimum. Seals are provided so that material pumped into the chamber will not leak past the periphery or edges of the drums. Means are provided for rotating the drums at the same peripheral speed and in the same direction, that is, in a direction from the wide end of the chamber toward the pinch point. Means are also provided for introducing material to be dejuiced into the chamber under superatmospheric pressure, preferably at the wide end of the chamber so that the introduced material moves in a direction coincident with the movement of the peripheries of the drums. Thereby the material introduced is first filtered by virtue of the difference in pressure within the chamber and the atmospheric pressure which exists about the outer periphery of the larger (outer) drum and the atmospheric pressure which exists about the inner periphery of the smaller (inner) drum. The filter cakes which form on the surfaces of the drums are continuously moved toward the narrow end of the chamber and gradually merged and gradually pressed with greater and greater force with a maximum of pressure at the pinch point. This pressing of the filter cake causes additional de-liquifying thereof. Means is provided for separately removing the pressed cake and the filtrate. Means is also provided for yieldably and adjustably forcing the drums together at the pinch point so that the degree of pressing can be controlled.

The device of this invention is particularly suited for the efficient separation of materials such as fruits, fruit pulps, and fruit wastes into their solid and liquid components. Separation of such materials into their solid and liquid components has previously been difficult because of their potentially slimy nature and the presence of finely divided cellular material. Commonly such separations are carried out batch-wise using devices such as rack-and-frame presses which require a large amount of hand labor. The known devices for conducting continuous filtering and pressing cannot handle fruit materials efficiently. Thus the known continuous devices tend to blind very rapidly necessitating frequent shutdowns for cleaning. If lower pressures are used in an effort to delay blinding, the filter cake has too high a liquid content and the juice recovery is poor. The device of this invention surmounts the disadvantages of the prior devices. Thus the device of this invention is continuous in operation and is admirably suited for the treatment of fruit materials to separate these materials into their liquid and solid components by continuous filtering and pressing operations. The device of this invention is efficient in that it can be used continuously for extended periods of time without the filter pores becoming clogged or blinded and the degree of separation is excellent in that the pressed cake contains a minimum of liquid and is suitable for drying without further treatment for example in a rotary kiln drier or similar device without balling or gumming. The primary feature which makes the present device particularly suited to the treatment of fruit materials lies in mounting a pair of rotating filter drums, one within the other in an eccentric arrangement with a horn-shaped chamber for receiving the material to be treated placed between the drums. This arrangement permits the continuous establishment of firm well-established filter cakes on each filter drum with gradually increasing pressure being applied to the cakes as they merge, the cakes remaining in the exact position where they are laid down. Under such conditions, the juice from both the filtering and pressing stages passes through an undisturbed filter cake and consequently both filtration and pressing are efficient and the juice obtained is clear. Further, the pressed cake is in a porous condition and can be readily removed from the filter drums.

Some additional advantages and features of the device of this invention are explained as follows:

By placing one filter drum eccentrically within the other a generally horn-shaped chamber for introducing material to be treated is formed in the space between the drums extending from the pinch point to a point where the drum surfaces are widely separated. The sides of this chamber are defined by the gradually converging surfaces of the filter drums. The horn shape of this chamber brings about many advantages, namely, efficient filtering and pressing action and efficiency and economy with regard to the size of the apparatus. With regard to the filtering and pressing action, the horn-shaped chamber exposes an extended area of the filter surfaces to the material being treated, the pressing takes place gradually because of the gradually converging sides of the chamber and it is impossible for material to be forced in a direction counter to the direction of drum rotation. These highly desirable features cannot be achieved with other arrangements of drum and filter chamber. For example, if a filter chamber is formed in the nip between two externally tangent, rotating filter drums the sides of the chamber would diverge very sharply with the result that the filter area would be smaller with a chamber of the same volume, the pressing would take place abruptly rather than gradually and there would be possibility of material being forced backward at the nip point by a rolling action. Regarding the matter of economy in size, it has been calculated that the device of this invention operating on turgid material such as apples, green pears, etc. would have a filtering and pressing capacity of 3 to 5 times that of a device having externally tangent drums of the same size. Another matter is that by fitting the drums one inside the other with the feeding chamber in between makes a very compact device. In contrast an externally tangent drum device would take up a space at least twice that of the device of this invention.

The chamber for receiving the material to be treated is placed between the filter drums and hence is necessarily small. This is a significant advantage in that no stagnant pool of material is formed. The material flows continuously through the chamber so that no settling or stratification occurs. This means that no agitator is required to keep the material uniform in composition. Devices equipped with such agitators cannot be used to handle fruit materials as the agitation aggravates rupture of cells and cell aggregates whereby filtration becomes difficult and inefficient. Further, by making the chamber small, the device has a low hold-up of material in process.

During treatment in the device of this invention, the material first thickens and forms filter cakes which then pass between two permeable surfaces where further liquid is expressed. By pressing the cake between two filter surfaces, the expressed liquid need travel a maximum of one-half the thickness of the cake, i. e., from the center to one filter surface, thus lessening the time and lowering the pressure required to obtain proper expression of liquid.

Another advantage relates to the manner in which the material to be treated is fed in relation to the filter surfaces. Thus in the present device, the movement of the material coincides with the movement of the filter surfaces. This means that the fresh material, i. e., that containing the highest liquid content, is initially contacted with a fresh, clean filter surface. By this means the fibers are properly oriented on the filter surface to form a cake which is in just the right condition for efficient pressing, that is, the liquid can be removed with a moderate degree of pressure, the liquid pressed out is clear and the pores of the filter do not become clogged.

A feature of the present invention is that no vacuum is required as with many known types of continuous presses.

The apparatus of this invention is easy to maintain in sanitary condition because a great area of the filter drums is constantly exposed and readily accessible for cleaning and inspection. This feature makes the present device particularly suitable for handling fruits and other food products where constant sanitation is essential.

The device of this invention is flexible in operation, a feature necessary for handling soft, compressible material such as fruits. This flexibility is afforded by: control of the pressure at the pinch point; control of the speed of revolution of the drums; and control of the pressure at which the material is forced into the filtering and pressing chamber.

Referring now particularly to the annexed drawing, wherein like numerals designate like parts, the embodiment of the invention illustrated therein is described as follows:

Reference is first made to Fig. 1 in which many of the parts have been omitted so as to obtain a clear picture of the flow of materials and the operation of the device. In this figure may be seen outer drum 1 and inner drum 2 eccentrically positioned within drum 1, both drums being made of perforated metal covered with wire screening or filter cloth. Drums 1 and 2 may be fabricated from other foraminous material suitable for filtering purposes. The size of drums 1 and 2 may be varied within wide limits, obviously the larger they are the greater will be the capacity of the device. From a practical standpoint, the drums may be from about 3'–6' in diameter. Further, the closer the drums are in size the more gradual will be the convergence of their surfaces and hence the greater will be the filtering and pressing area available. The ratio of drum diameters to use in any particular application will depend on the nature of the material being treated and the amount of pressing required to express a given proportion of liquid from the material. In many cases, the device wherein drum 2 has a diameter of $9/10$ to $9/10$ that of drum 1 gives good pressing results and allows sufficient room for introduction of material between the drums.

Each of drums 1 and 2 is rotated about its own axis in a counterclockwise direction at the same peripheral speed. The material to be filtered is pumped under superatmospheric pressure by pump 60 through pipe 3 and plate 5 into stationary chamber 4 which is generally horn-shaped and is defined as the space between outer drum 1 and inner drum 2 extending from plate 5 to pinch point 6—the point where drums 1 and 2 are closest together. (As will be shown hereinafter chamber 4 is sealed at top and bottom by cover members 51 and 52 shown in Fig. 5.) In chamber 4 filtering action takes place and filter cakes form on the inner surface of drum 1 and the outer surface of drum 2 as indicated by 7 and 8. As drums 1 and 2 rotate filter cakes 7 and 8 are merged and gradually subjected to increasing pressure as the merged cake 9 passes through the decreasing space between drums 1 and 2. The maximum pressing obtains at pinch point 6 where the space between drums 1 and 2 is at a minimum. The pressing causes additional de-liquefying of the filter cake. As the merged filter cake proceeds counterclockwise past the pinch point 6, the pressure is released because of the increasing distance between the drums 1 and 2 and the pressed cake falls away from the drums and may be collected in a hopper and removed therefrom by a belt conveyor, screw conveyor, or other conventional device. It is a feature of the present device that the pressed cake leaves the drums at a point remote from the area where the major part of the liquid exudes through the filter drums. This means that the possibility of re-absorption of liquid by the pressed cake is minimized. In most cases the pressed filter cake 10 will fall free of drums 1 and 2 by the action of gravity.

It is to be noted that the filtering and pressing operations which occur in the device of this invention are favorable and efficient. The point is that the material to be filtered is initially introduced into chamber 4 where the filter surfaces are relatively far apart. Thus the first action which takes place is filtering and filter cakes gradually build up on the drum. As the filter cakes merge the space between drums 1 and 2 decreases so that the merged cake is gradually subjected to increasing pressure which reaches a maximum at pinch point 6. Such a sequence of filtering followed by pressing with gradually increasing pressure means that the de-liquefying is very efficient and little if any clogging of the filter surfaces occurs. The action of the instant device is to be contrasted with devices wherein a sudden pressure is applied to a slurry to get both filtration and pressing simultaneously; in such case the filter tends to clog and the pores of the filter become sealed with finely divided material.

The filtrate passing through drums 1 and 2 runs down the outer surface of drum 1 and the inner surface of drum 2 collecting in troughs 13 and 14 attached to drums 1 and 2, respectively. The filtrate is sucked out of these troughs by syphon pipes 15 and 16 via pump 17 actuated by motor 18.

Though not apparent in Fig. 1, the drums 1 and 2 are preferably tilted somewhat to assist in removal of filtrate and to minimize contact of the filtrate with the pressed cake 10. To this end the axes of drums 1 and 2 are parallel and essentially in a vertical plane but tipped slightly (0°–20°, usually about 10°–15°) from the true vertical so that the lowest point of the drums is adjacent syphon pipes 15 and 16 and their highest point is adjacent the point diametrically opposite where the pressed cake 10 is released from the drums.

Figure 2:
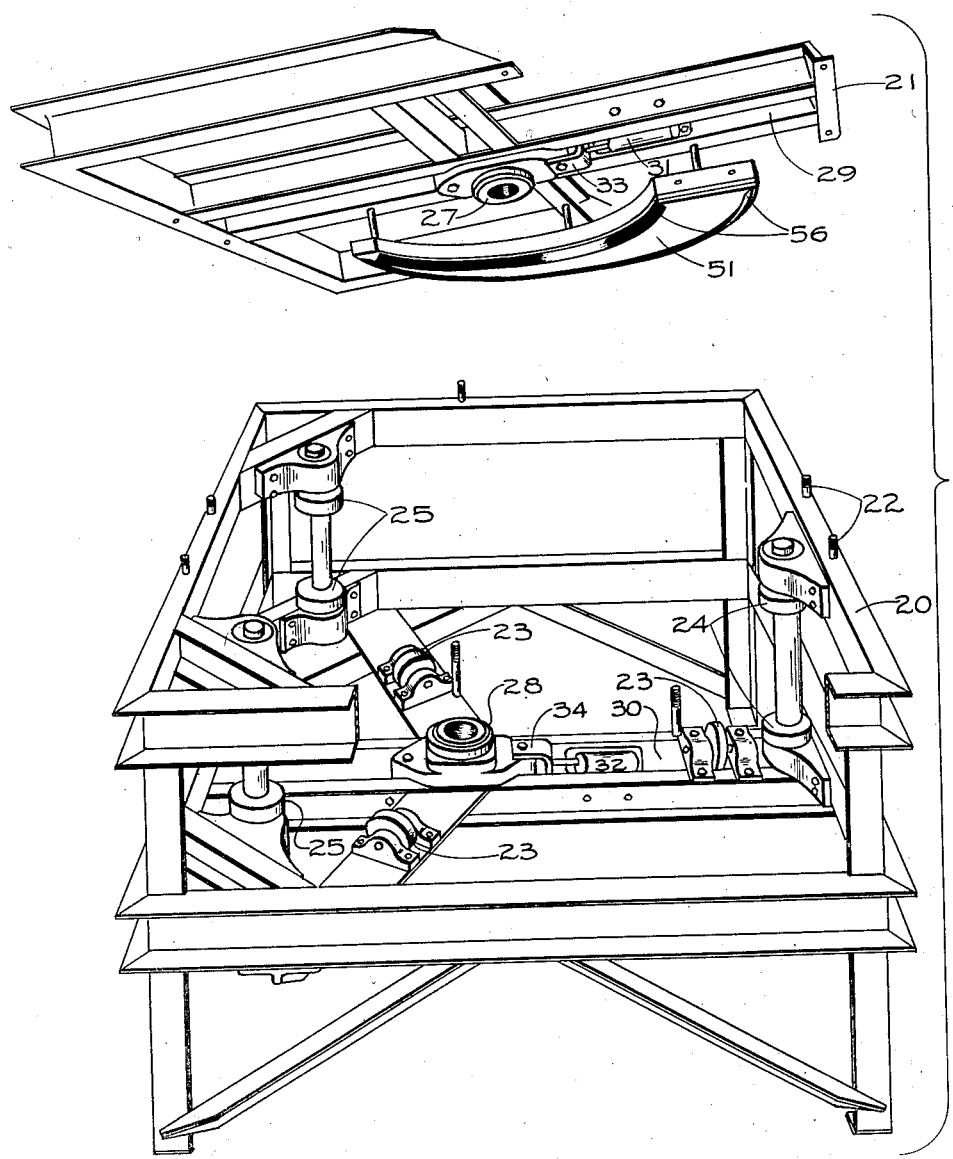
Fig. 2 illustrates the framework for holding the filter drums and the means for yieldably forcing them together. This figure is an exploded view with parts of the framework being separated for clarity of representation.

Reference is next made to Fig. 2 in which is illustrated the framework for supporting drums 1 and 2 and the means for varying the pressure applied at pinch point 6. Referring to this figure, the support for the drums 1 and 2 comprises lower frame 20 and upper frame 21 fastened together by bolts 22. Drum 1 rests on rollers 23 and is maintained in position by rollers 24 and 25. Drums 1 and 2 are so positioned that pinch point 6 is adjacent to rollers 25 which resist the thrust of the pressure applied at the pinch point 6. Shaft 26 (Figs. 3 and 4) to which drum 2 is fastened is supported by bearings 27 and 28 which are slidable in slots 29 and 30, respectively. For varying the pressure applied at pinch point 6 where drums 1 and 2 come closest together, there are provided hydraulic cylinders 31 and 32 attached within slots 29 and 30, respectively. The pistons in these cylinders are attached via arms 33, 34 to bearings 27 and 28, respectively. By pumping a fluid into cylinders 31 and 32, the pressure exerted at pinch point 6 may be varied as desired. This hydraulic system also provides yieldable resistance to the pressure exerted at the pinch point. It is obvious that instead of hydraulic cylinders, springs or rubber buffers could be used. The gap between drums 1 and 2 at pinch point 6 will depend on the type of material being treated and the degree of pressing desired. Obviously, if the rate of feed is kept constant, as the gap is decreased, a greater degree of liquid expression will be obtained. In most cases retaining a gap of on the order of ⅛" to ⅜" will give good results with fruit materials.

On upper frame 21 is secured upper cover member 51 and flexible strips 56 which serve to close the upper part of chamber 4 as explained below in connection with Fig. 5.

Figure 3:
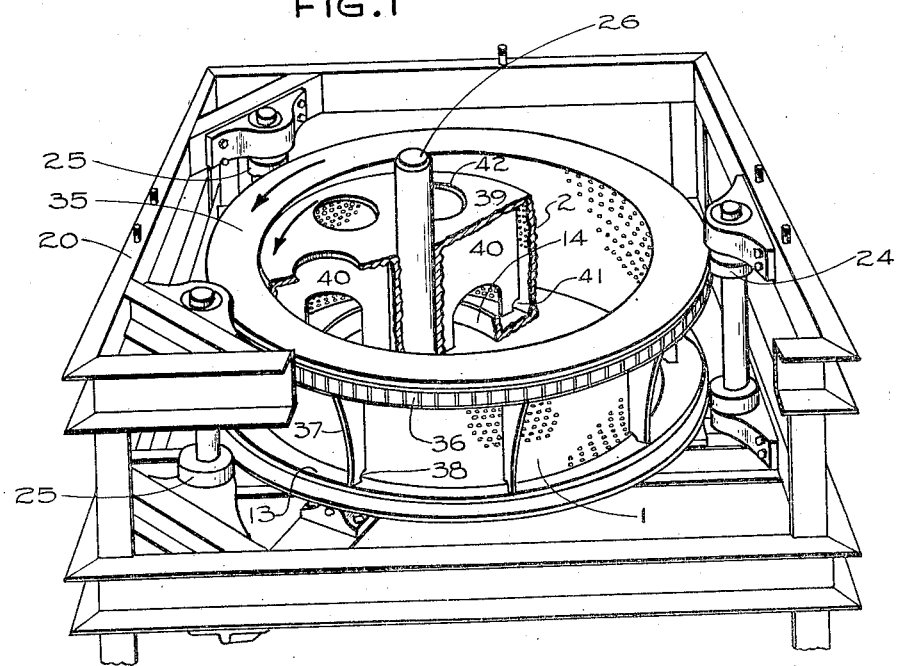
Fig. 3 illustrates the lower framework of the device with the filter drums in place for operation. This view has parts broken away to demonstrate the construction of the filter drums.

In Fig. 3 is illustrated lower frame 20 with drums 1 and 2 in place as they would be in operation; the construction of the drums is also depicted. Referring to this figure, outer drum 1 is provided with trough 13 for collecting the filtrate and an upper flange 35 to which is welded a roller-chain 36. The latter serves as a means for rotating drum 1 as explained hereinafter. A series of webs 37 are provided to add reinforcement, the webs being provided with ports 38 to allow free passage of filtrate.

Inner drum 2 is attached to shaft 26 by disc 39 and reinforcing webs 40. Ports 41 are provided in webs 40 for passage of the filtrate which collects in trough 14. Handholes 42 in disc 39 are provided for inspection and cleaning purposes.

Figure 4:
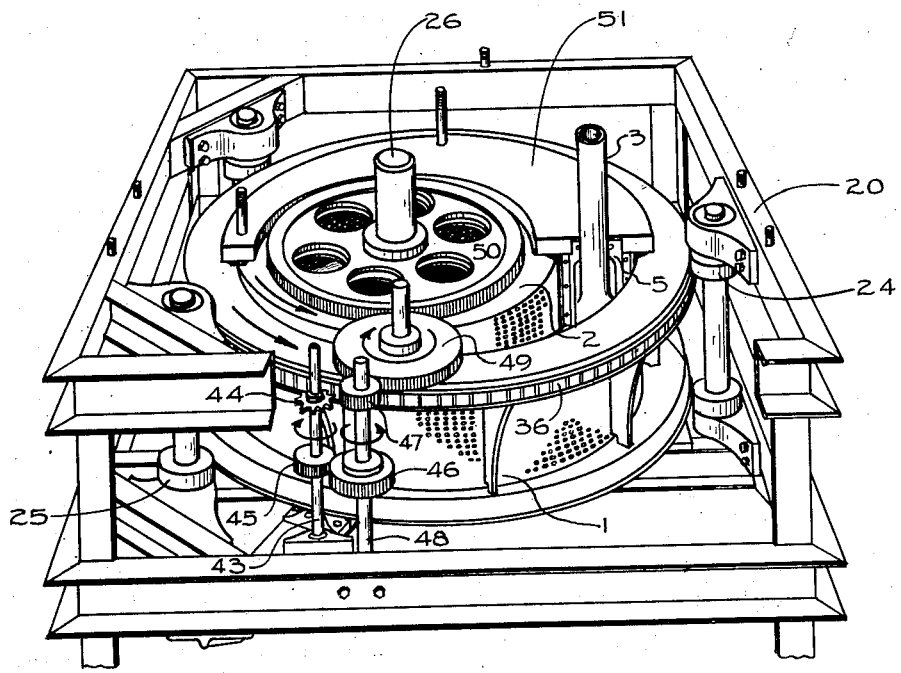
Fig. 4 is similar to Fig. 3 and also discloses the means for rotating the drums and the arrangement of parts for forming a filtering and pressing chamber.

Reference is now made to Fig. 4 which illustrates lower frame 20 with drums 1 and 2 in place for operation including the means for rotating the drums. Referring to this figure, there is provided a shaft 43 which is rotated by a suitable means such as a variable-speed electric motor (not illustrated). Sprocket 44 attached to shaft 43 engages roller-chain 36 fastened to drum 1 whereby this drum is rotated. Drum 2 is rotated in the same direction and at the same peripheral speed as drum 1 from the rotation of shaft 43 through the train of gears including: gear 45 attached to shaft 43, gears 46 and 47 attached to shaft 48, idler 49, and gear 50 attached to shaft 26. Idler 49 may be supported by a conventional bearing attached to the upper frame 21 (Fig. 2). The actual speed of rotation of drums 1 and 2 may be varied depending on the material being treated, the amount of material to be handled, the degree of separation of liquid and solids desired, etc. In many cases a peripheral speed on the order of 30 to 300 inches per minute gives good results with fruit materials. The above-described drive mechanism permits the movement of drum 2 necessary to adjust the distance between drums 1 and 2 at pinch point 6. Thus the contact point between gear 50 and idler 49 is 90° removed from pinch point 6. Thereby drum 2 can be moved along the line extending from the center of roller 25 through pinch point 6 and the center of shaft 26 a reasonable distance, up to about 0.5 to 1 inch, without materially affecting the engagement of gear 50 and idler 49.

Drums 1 and 2 are rotated at the same peripheral speed to avoid shearing and crushing the press cake between the drums. In some instances, it may be possible to eliminate the positive drive to drum 2 and drive only drum 1 in which case drum 2 would be caused to rotate by the action of drum 1 in cooperation with the press cake between the two drums at the pinch point. It is preferred however to positively rotate both drums.

Figure 5:
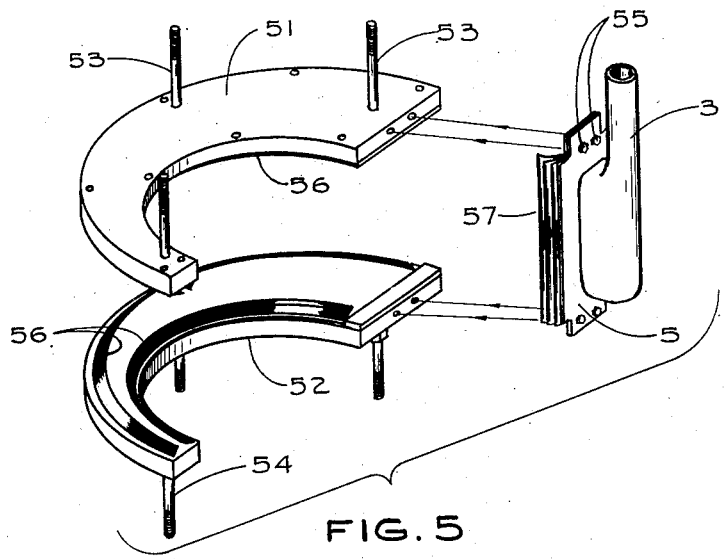
Fig. 5 is an exploded view illustrating the arrangement of seals for forming the filtering and pressing chamber between the filter drums.

Fig. 5 illustrates the arrangement of seals used to close the top and bottom of chamber 4. Cover members 51 and 52 are tapered arcuate members which are positioned on top and bottom, respectively, of the filter drums extending from plate 5 to pinch point 6 where the drums are at their closest proximity. Cover member 51 is fastened to upper frame 21 by bolts 53; cover member 52 is fastened to lower frame 20 by bolts 54. Cover members 51 and 52 are also fastened at their wide ends by bolts 55 to plate 5. Each of cover members 51 and 52 is provided with strips of flexible material 56 whereby to prevent leakage of liquid past the seals. Plate 5 is provided with flexible strips 57 to prevent leakage of liquid past the surfaces of drums 1 and 2. Rubber and neoprene have been found excellently suitable as the flexible material for this purpose. In operation cover member 51 presses against the upper surfaces of flange 35 on drum 1 and disc 39 on drum 2; cover member 52 presses against the lower surfaces of flange 13 on drum 1 and flange 14 on drum 2. Thereby it is evident that cover members 51 and 52 in cooperation with plate 5 ensure the retention of the material to be filtered in chamber 4.

Having thus described our invention, we claim:

A device for subjecting a material to successive filtering and pressing which comprises a pair of hollow cylinders provided with foraminous filter surfaces, the cylinders being mounted with their axes parallel and in an essentially vertical plane, one cylinder being smaller than the other and being mounted eccentrically within the larger cylinder to provide side walls of a chamber in the space between the cylinders, plate means defining end, top, and bottom walls of said chamber, flexible sealing means between said plate means and said cylinders to prevent leakage of liquid from said chamber except through said foraminous surfaces, means for feeding material to be treated into said chamber, means for collecting liquid which passes through said foraminous filter surfaces, said liquid collecting means including a first annular trough mounted on said larger cylinder about the external periphery thereof and a second annular trough mounted on said smaller cylinder about the internal periphery thereof, means for removing liquid from said troughs, and means for rotating said cylinders in the same direction.

(References on following page)

References Cited in the file of this patent

UNITED STATES PATENTS

| | | |
|---|---|---|
| 49,088 | Crerer et al. | Aug. 1, 1865 |
| 315,338 | Raymond | Apr. 7, 1885 |
| 390,651 | Crawford | Oct. 9, 1888 |
| 714,856 | Birkholz | Dec. 2, 1902 |
| 1,655,333 | Perazio | Jan. 3, 1928 |
| 2,254,517 | Fleming | Sept. 2, 1941 |
| 2,313,996 | Hoolhurst | Mar. 16, 1943 |
| 2,682,832 | Lohre et al. | July 6, 1954 |

FOREIGN PATENTS

| | | |
|---|---|---|
| 25,406 | Germany | Jan. 12, 1884 |
| 28,456 | Great Britain | A. D. 1904 |
| 187,935 | France | Dec. 28, 1887 |
| 592,105 | France | Apr. 23, 1925 |